United States Patent

Jabbusch et al.

[11] 3,894,627
[45] July 15, 1975

[54] CONVEYOR FOR INTERSPACING ARTICLES

[75] Inventors: Robert O. Jabbusch; Carl J. Gerlach, both of Green Bay, Wis.

[73] Assignee: FMC Corporation, San Jose, Calif.

[22] Filed: June 1, 1973

[21] Appl. No.: 365,942

[52] U.S. Cl. ............................... 198/34; 198/183
[51] Int. Cl. ............................................ B65g 47/28
[58] Field of Search ................... 198/183, 34, 127

[56] References Cited
UNITED STATES PATENTS

| | | | |
|---|---|---|---|
| 1,773,525 | 8/1930 | Draper | 198/183 |
| 2,272,677 | 2/1942 | Meneray et al. | 198/183 |
| 2,959,273 | 11/1960 | Sykes | 198/183 |
| 3,292,767 | 12/1966 | Lobdell et al. | 198/183 |
| 3,373,860 | 3/1968 | Lindgren et al. | 198/183 |

FOREIGN PATENTS OR APPLICATIONS

| | | | |
|---|---|---|---|
| 254,046 | 10/1962 | Australia | 198/183 |

Primary Examiner—Richard A. Schacher
Assistant Examiner—Richard K. Thomson
Attorney, Agent, or Firm—C. E. Tripp

[57] ABSTRACT

A conveyor is disclosed which effects longitudinal separation of a single file of articles fed thereto in abutting relation. Separation is effected by providing conveyor sections comprising at least two non-powered rollers straddled by powered rollers rotating to retain the article on the non-powered rollers. The conveyor structure also lends itself to handle multiple files of articles, articles which vary in length, height and width, and articles which are fragile and easily damaged.

10 Claims, 14 Drawing Figures

FIG_7

FIG_8

CONVEYOR FOR INTERSPACING ARTICLES

BACKGROUND OF THE INVENTION

Continuous processes, including product handling for labelling, wrapping, weighing, cartoning, etc., each have their peculiar aspects which is reflected in the design and location of machinery to perform the intended sequence of operations at low unit cost consistent with product quality.

One such industry where continuous processes are widely practiced for purposes of consistent product quality at economical cost is the food industry.

Machinery is widely available that dispenses measured quantities of ingredients and combines them to produce a food product such as fruit, soups, baked goods, etc. In all such operations the container (where cans, bottles or jars are used) is automatically handled by conveying systems that present the containers to machinery for filling, closing, labelling, weighing and cartoning a plurality of containers for shipping.

Design requirements of the different machinery involved mainly depends on the product or the container being handled. For example, very high speeds can be achieved in bottling and canning operations because the container will sustain shock forces occasioned by direction changes and/or conveyor lugs. Some fragile products, such as bakery goods and candy, exemplified by cookies, cakes, crackers, chocolate covered candy and bars, etc., require handling which will not distort, break, chip or crack the product or its coating. Thus, such fragile products consistently demand gentle handling to preserve commercial acceptance. Such a requirement has in the past dictated lower handling speeds for fragile products.

It is, accordingly, the purpose of the present invention to provide a product handling system which not only spaces and arranges the products on a conveyor for wrapping, labelling and/or cartoning of the product at higher speeds than is presently known, but fulfills this requirement without causing damage to the product.

In order to properly wrap items of the above-mentioned nature, and items such as playing cards, gift wraps, batteries, etc., in cellophane, polyethylene, polypropylene, paper and a variety of webs on a continuous basis by machinery of the horizontal form, fill and seal type, a requirement is that the products be delivered in timed relation to the wrapping machine. In the case where the incoming products are initially abutting, they must be spaced apart and fed in timed relation to the wrapping machine. such timing and spacing is oftentimes achieved by providing a conveyor, usually of the chain-type with a series of equally spaced feed-lugs that engage the trailing end of each product and convey it to a position between feed lugs of the wrapping machine. The wrapping machine lugs convey the product to the interior of the wrap which has been formed to assume a tubular configuration. Thereafter the wrap is transversely sealed and severed, thus producing individually wrapped products.

The problem of properly feeding delicate and fragile products (bakery goods and chocolate covered candy) to the wrapper in-feed conveyor of a wrapping machine and pre-spacing those products along that conveyor is particularly acute when it is desired to do so semi-automatically or automatically in order to achieve high speeds. In the past the obvious method was to manually place each product on the in-feed conveyor but speeds were low and manual handling was undesirable. Semi-automatic arrangements, consisting of a conveyor belt along one side of the wrapping machine in-feed conveyor, often resulted in damage to the product occasioned by the impact resulting when the feed lugs engaged the product. Cookies cracked, and the chocolate covering on candy would chip.

Automatic feeders providing high-speed capabilities and operative to align a product into individual lanes, have been employed by using belts positioned either in-line with or perpendicular to the in-feed lug conveyor, for sequentially feeding the product from an assembly point, where the product is crowded or aggregated, to the lugs of the in-feed or wrapper conveyor. In all the above instances, sliding contact between individual products and impact by the feed-lugs of the in-feed or wrapper conveyor exist. The purpose of the present invention is to avoid such conditions.

An important aspect of this invention is that it does not require accurate individual product length and dimension control as required in some high-speed feeders. For example, individual products may easily vary ± 20 percent in length, so long as the mean average length of a group of continuously fed products is within 5 percent.

SUMMARY OF THE INVENTION

According to the present invention there is provided a conveyor for spacing a file of abutting articles without sliding contact or crowding pressure, and for feeding the articles in timed relation to a lug conveyor. The system may have various constructional modifications, but basically it comprises feeding articles to a non-lug roller conveyor which has non-driven or static idler product supporting rolls mounted between driven dynamic rolls. The driven dynamic rolls function to move the products onto the idler rolls, and to maintain them there. In this manner, gaps are formed between products on the conveying surface to provide access by overhead conveying lugs for transferring the products into the wrapping machine. The length of the individual products is not the controlling factor for proper timed feeding into the wrapping machine because successive overhead conveying lugs will always intersect the path of the products in the gap between two adjacent products so that, the length of the products can vary considerably.

According to a preferred feature of the invention, the conveying mechanism comprises a conveyor for supporting and transporting a series of articles to a lug-conveyor. The conveyor includes successive static roller conveying sections and dynamic roller sections, which may take the form of driven and idler roller, cooperating to effect longitudinal spacing of the product in which the gaps between articles have a timed relation with the lugs on a lug-conveyor of a wrapping, labelling or other type machine where in-line spacing is required. A conveyor of this general constructional arrangement is particularly adapted to easily handle variations in product length, as previously mentioned, plus variations in height and width.

A "static" roller section is a section of the conveyor wherein the supported article moves in the same direction and at the same speed as that of the conveyor; whereas a "dynamic" roller section is a section wherein the article is moved relative to the conveyor section until the article is deposited on a static section. The static roller section is made up of idler rollers that translate with the conveyor, and the dynamic section is made up of driven rollers that both translate with the conveyor and move articles relative to the conveyor.

A further and important feature of the present invention is to provide in-line separation of each product derived from a single file of lightly crowded products without relative sliding movement between the product and its supporting surfaces. This will provide a continuous high-speed automatic spacing control with minimum product damage, and the separation created is in a fixed, timed relation with the conveying lugs of a wrapping machine, or of any similar machine requiring a spaced input of timed articles.

Another feature of the present invention is the ability to batch feed multiple products since all that is necessary is to deposit the products, in any random fashion on the conveyor which will then automatically separate each individual product without shear or sliding contact.

DETAILED DESCRIPTION OF PREFERRED EMBODIMENT

Figure 1:
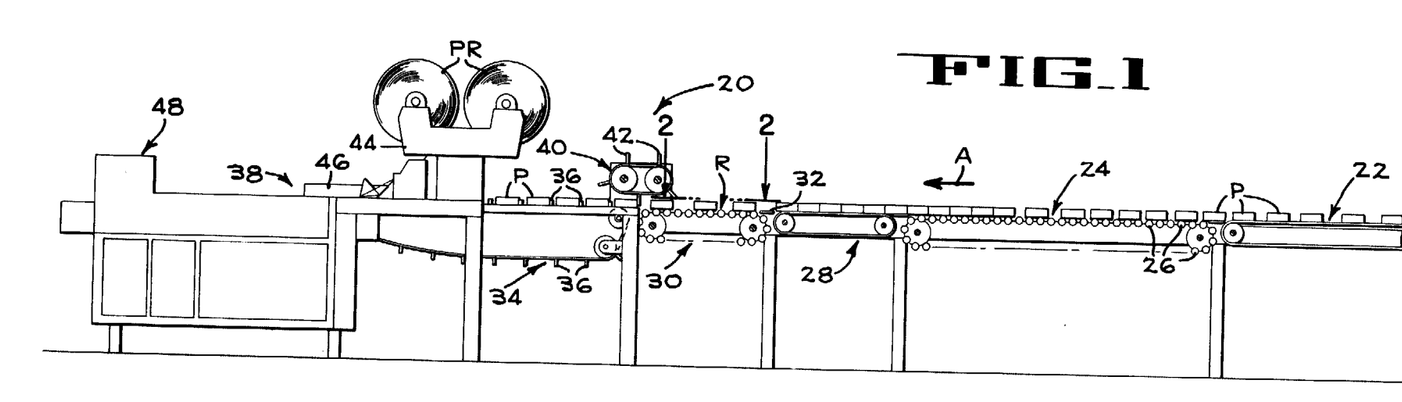
FIG. 1 shows the conveyor of the present invention coupled to product supply conveyors and a horizontal form, fill and seal wrapping machine.

FIG. 1 illustrates a packaging system which is exemplary of one environment in which the novel conveyor incorporating the principles of the present invention can be used. The packaging system, generally identified by the numeral 20, comprises a supply conveyor 22 for feeding articles or product P to a pressureless conveyor 24 provided with a series of freely rotating product supporting rollers 26. The rollers 26 not only transport the articles received from the conveyor 22 in the direction of the arrow A, but in the event the articles come into abutting engagement, the force tending to move the articles in the forward direction is held to a minimum since the rollers 26 are free to rotate. Located in longitudinal alignment with the discharge end of the conveyor 24 is a conventional belt feed conveyor 28 which accumulates a series of in-line products for delivery to a conveyor 30 which is the subject matter of the present invention.

As will be explained in greater detail hereinafter, the conveyor 30 is provided with a series of driven and idler rollers generally indicated by the letter R, selected ones being positively rotated in a desired direction as the conveyor 30 advances the rollers and articles. Bridging the gap between conveyors 28 and 30, and provided for purposes of supporting the article during transfer between these conveyors is a dead plate 32.

Longitudinally adjacent and aligned with the conveyor 30, is an infeed conveyor 34 (sometimes herein referred to as the lug conveyor), provided with a series of equally spaced lugs 36. The conveyor 34, in the present example, feeds products to a continuous wrapping machine 38 whose general constructional arrangement and function is shown in U.S. Pat. Nos. 2,682,331 and 2,762,178 which are assigned to the assignee of the present invention. Timed transfer of individual products from the conveyor 30 to the conveyor 34 is accomplished by providing an overhead conveyor 40, including a series of lugs 42, which are timed to each move into a gap between adjacent products, and advance the leading product ahead of one of the lugs 36. Accordingly, the individual products on infeed lug conveyor 34 are equally longitudinally spaced for timed delivery to the wrapping machine 38.

The wrapping machine 38 includes the usual unwind stand 44 rotatably mounting a pair of parent rolls PR of a printed or unprinted thermoplastic web. The web of one of the rolls is continually unwound while the other is held in reserve. The web from the parent roll being unwound is passed through a former 46 for machining or forming the web to assume a tubular configuration. Each product is successively introduced into the formed web in register with a printing pattern that may be present on the web. Thereafter the entubed product is transported by the web to a transverse sealing and severing station 48 which results in producing individual packages.

Figure 2:
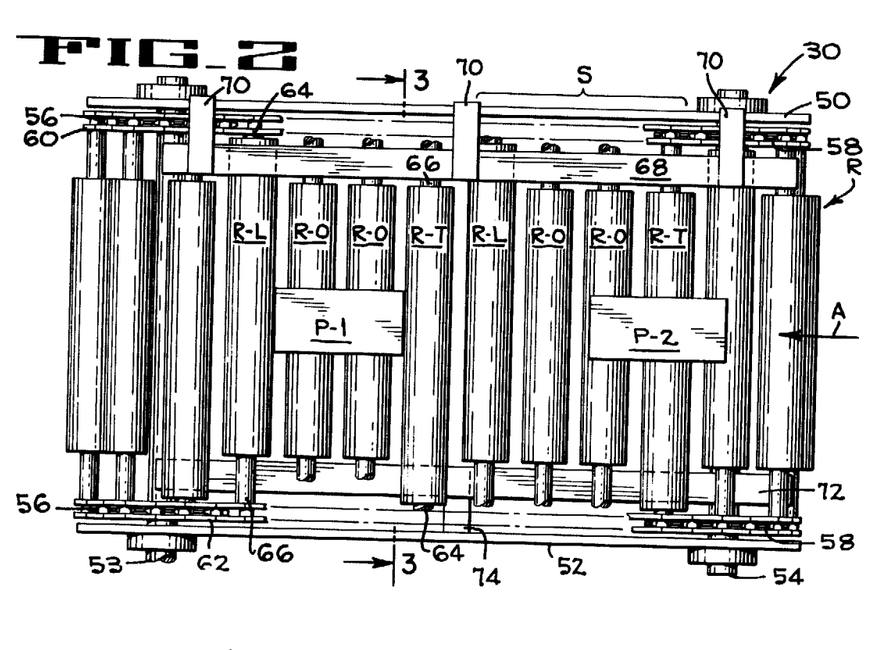
FIG. 2 is an enlarged plan view taken in the direction of arrows 2—2 of FIG. 1.
Figure 3:
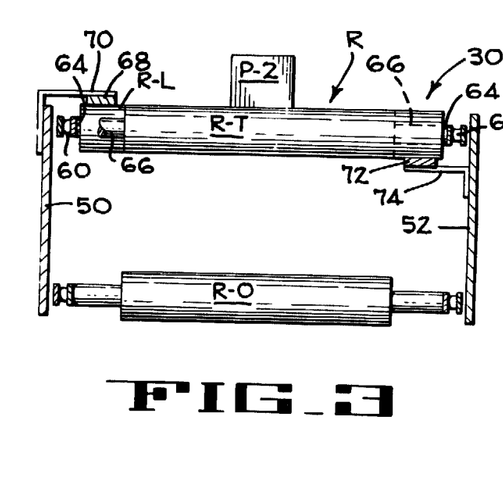
FIG. 3 is a transverse section taken substantially along the line 3—3 on FIG. 2, FIGS. 4, 5 and 6 are greatly enlarged fragmentary longitudinal sections of a product supply conveyor feeding product to the conveyor of the present invention and illustrates the manner in which longitudinal separation occurs.

One constructional arrangement which the novel conveyor of the present invention can take is shown in FIGS. 2 and 3. It will be seen that a pair of laterally spaced elongate side frame members 50 and 52, have transversely extending longitudinally spaced shafts 53 and 54 rotatably mounted thereon. On the shafts 53 and 54 are secured, respectively, sprockets 56 and 58 located adjacent the inner surface of the frames 50 and 52. Sprocket chains 60 and 62 are drivingly engaged with each pair of longitudinally aligned sprockets.

At regularly spaced intervals a series of laterally extending rollers, collectively identified as R, are carried by and rotatably mounted to the sprocket chains 60 and 62. As will be explained in greater detail hereinafter, a set of rollers define a conveying section which is operative to effect a desired longitudinal spacing between each product. The longitudinal spacing occurs by imparting rotation, either in a clockwise or counterclockwise direction, to selected dynamic rollers with such rotation occurring when the rollers are translated by the sprocket chains. In FIG. 2 a set S of rollers defining a conveying section are identified as: R-L, the leading powered of driven dynamic roller of a conveying section; R-O, idler or static rollers on which the product is held stationary relative to the conveyor 30; and R-T, the trailing powered or dynamic driven roller.

Considering the roller set supporting the product P-1 on rollers R-O, it will be observed that the driven roller R-L is made with a short stub shaft portion 64 on the end adjacent the sprocket chain 60 while it is provided with a longer stub shaft portion 66 adjacent the sprocket chain 62. The trailing driven roller, R-T, has a reverse orientation since its short stub shaft portion 64 is adjacent the sprocket chain 62 while the longer stub shaft portion 66 is adjacent the sprocket chain 60. The staggered relation of the leading driven roll R-L and the trailing driven roll R-T is for the specific purpose of imparting rotation (clockwise as viewed in FIGS. 4-6 for the roll R-L and counter-clockwise for the roll R-T) when the sprocket chains 60 and 62 are moving.

Figure 4:
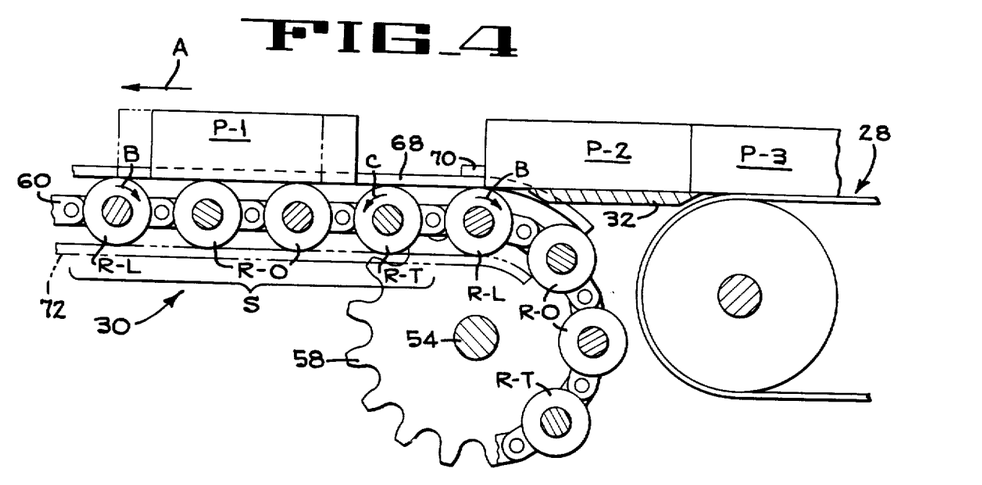

Rotation is imparted to these rolls by a friction drive mechanism, in this embodiment, comprising a stationary rail 68 overlying the rollers and supported in such position by longitudinally spaced brackets 70 secured to the side frame 50. Frictional engagement of the rolls R-L with the rail 68 imparts clockwise rotation thereto which is indicated by the arrow B (FIG. 4). Rotation of the trailing driven roll R-T, which rotates in a counterclockwise direction, is effected by providing a rail 72 underlying the rollers and supported by brackets 74 which are secured, in any desirable manner, to the side frame 52. FIG. 3 illustrates the driven roller R-L in frictional engagement with the rail 68 and the driven roller R-T in frictional engagement with the rail 72. The idler rollers R-O have longer stub shaft portions of equal length (FIG. 3) at each end so that no contact with either of the stationary rails 68 or 72 occurs.

Accordingly, the rollers R-O are static and function to support and maintain the product stationary relative to the side chain 58. The rails 68 and 72 may have their surfaces prepared or laminated with friction material, such as rubber, to insure positive continuous driving relation with the rolls. Surface preparation may include some form of knurling or possibly a rack mating with complementary surfaces on the rolls.

FIG. 2 shows a product identified as P-2 on driven roller R-T and idler roller R-O of a conveying set of rollers. The roller R-T is, by virtue of its engagement with the rail 72 rotating in the direction of the arrow C (FIG. 4) which will be considered the counterclockwise direction. The product will be conveyed and moved relative to the rollers toward the driven roller R-L, and if it encounters driven roller R-L, it will be urged to assume a static position on the idler rollers R-O. Thus the longitudinal distance between the products P-1 and P-2 will be determined by the pitch of the conveying sets of rollers making up the conveyor 30, with the products resting on sets of idler rollers R-O, within the limits of the spaces defined by the driven rollers R-L and R-T.

Figure 5:
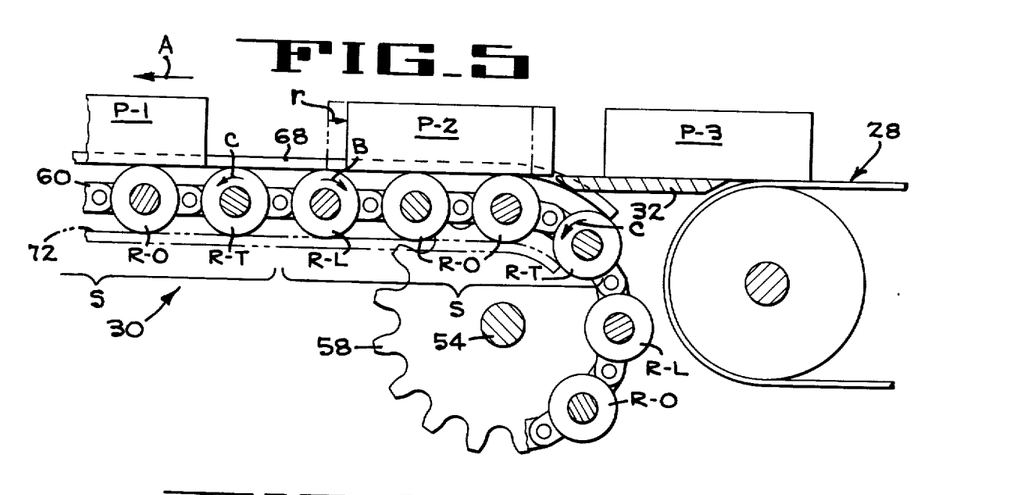
Figure 6:
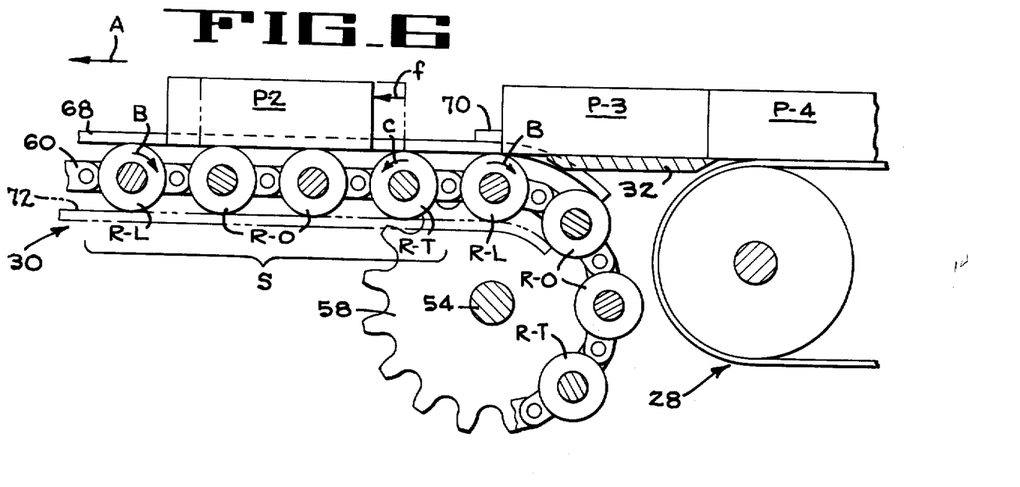

FIGS. 4, 5 and 6, which are large fragmentary portions of the juncture of belt conveyor 28 and conveyor 30, diagrammatically illustrate the sequence of events occurring when the abutted products on conveyor 28 are transferred to and longitudinally separated by the conveyor 30.

The products being transferred are identified as P-1, P-2, P-3 and P-4 which constitute, for purposes of this description, a series of successive in-line products. In FIG. 4 the product P-1 is shown (in full-line outline) fully supported on the idler rollers R-O of the conveying set S comprising the leading driven roll R-L, rotating in a clockwise direction, two idler rolls R-O, and a trailing driven roll R-T, rotating in a counterclockwise direction. The phantom outline position of the product P-1 illustrates the initial location it assumes on the conveyor 30, It will be noted that the forward lower edge of the product P-1 (in phantom) is in contact with the driven roll R-L. By virtue of the direction of rotation of this roll, the product is urged rearwardly to assume the desired position over the idler rolls R-O.

The arrow A is for the purpose of illustrating the direction in which the product P-1 is moved. In the event it should encounter the trailing driven roll R-T it is moved, by virtue of the direction of rotation of the roll R-T, slightly forwardly to assume the desired position on the idler rolls R-O.

The succeeding product P-2 is shown positioned over the dead plate 32 and its forward lower edge is in contact with the leading driven roll R-L, rotating in a clockwise direction, of a succeeding conveyor set S. The direction of rotation of the driven roll R-L above the shaft 54, at the instantaneous event illustrated in FIG. 4, has the effect, in combination with the friction of the product on the surface of the dead plate 32, of holding back the single file of articles on the conveyor 28. As the driven roller R-L advances toward the left as viewed in FIG. 4 (shown in an advanced position in FIG. 5) the product P-2 advances as it comes in contact with the first and second idler rolls R-O. FIG. 5 shows the product P-2 (in full outline) totally supported on the idler rolls R-O. but prior to assuming this position it is moved rearwardly in the direction and to the extent indicated by the arrow r. At this time a slightly longitudinal spacing is created between the adjacent products P-2 and P-3.

The speed of the conveyor 28 is set, in feet per minute, by multiplying the average product length times the number of products handled per minute by the wrapping machine. Since the conveyor 28 continually urges the single file of abutted products toward the conveyor 30, the succeeding product P-3 is free to move onto the conveyor 30 as the product P-2 is advanced. In FIG. 6 it should be noted that the product P-2 which has been moved rearwardly by the clockwise rotation of the leading driven roll R-L may encounter the trailing driven roll R-T rotating in a counterclockwise direction. In such an event the product P-2 is moved to the left, as viewed in FIG. 6, and such movement is illustrated by the phantom outline position, with the extent of such movement being shown by the small arrow $f$. The subsequent product P-3 has at this time been advanced so that its lower edge encounters the leading driven roll R-L of a subsequent conveying section. The product P-3 is moved onto the conveyor 30 in accordance with the same sequence of events described above in connection with the product P-2.

Accordingly, in view of the above described cooperation between the belt conveyor 28 and the conveyor 30, the products in a single file of longitudinally aligned and abutted products on the conveyor 28 are successively removed therefrom and longitudinally separated substantially equal distances by the conveyor 30, which is constructed and arranged to incorporate the article-spacing concept of the present invention.

Figure 7:
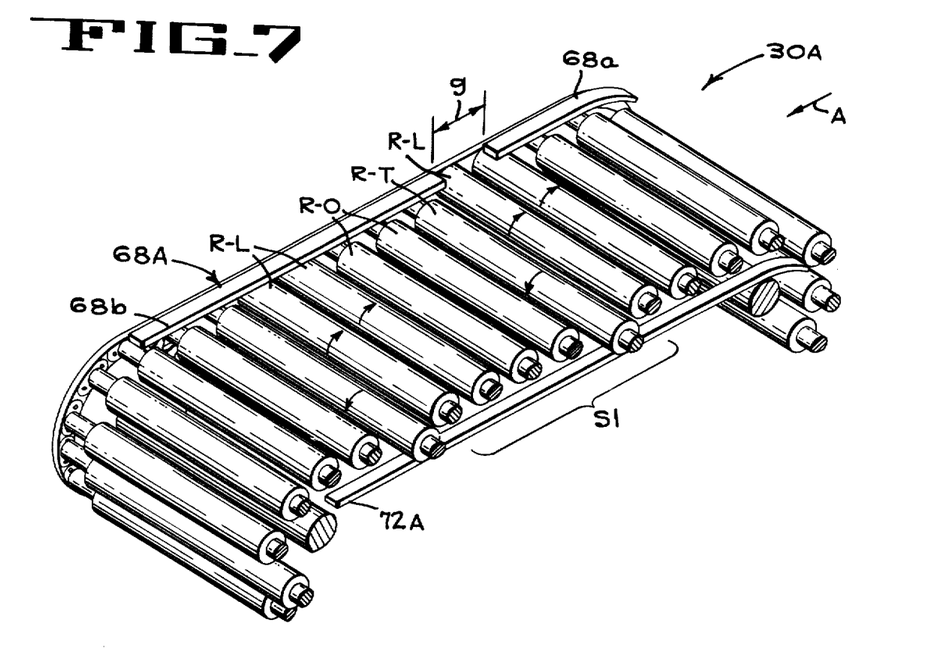
FIGS. 7, 8, 9 and 10 are diagrammatic perspective views illustrating modifications that can be made depending on various packaging requirements.

The diagrammatic perspective of FIGS. 7, 8, 9 and 10 illustrate modifications which can be made to the conveyor 30 which may be dictated by the likelihood of random discharge from the belt conveyor 28 or by the size and physical properties of the product being packaged. In FIG. 7 the upper rail 68A takes the form of rail sections 68a and 68b which provide an interrupted portion or gap g for momentarily arresting powered rotation of the rolls in frictional engagement therewith. A conveying section S1 of the form shown in FIG. 7 includes two leading driven rollers R-L rotating in a clockwise direction, two idler rollers R-O, and a driven trailing roll R-T.

According to this arrangement, if the product is discharged from belt conveyor 28 (not shown) onto conveyor 30A substantially out of synchronism with a conveying section, the product may first encounter two powered rollers turning in opposite directions (the driven rollers R-L and R-T of two adjacent conveying sections S1). If this happens, the article will tend to remain in that position. In order to positively move the product onto idler rollers, powered rotation of the driven rollers R-L is temporarily interrupted by the gap portion g of the rail sections 68a and 68b. Thus, the gap portion g momentarily interrupts powered rotation of the leading driven roll R-L so that the trailing driven roll R-T which supports the product will move the product forward onto the idler rolls R-O. The trailing driven roll R-T of the conveying section S1 is continuously rotated in a counterclockwise direction by the lower rail 72A. Thus by virtue of stopping and starting only the driven rollers R-L, individual products that may initially be supported by two oppositely rotating power rolls are positively urged longitudinally onto idler rollers R-O so that random discharge from the conveyor 28 to the conveyor 30 does not adversely affect the longitudinal spacing operation.

Figure 8:
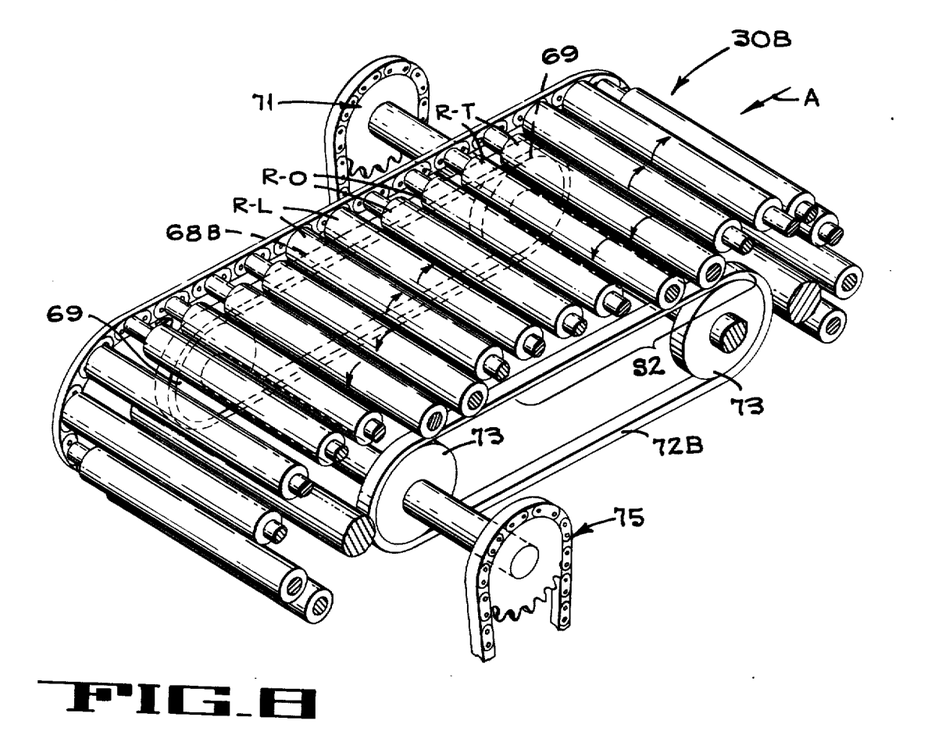

The modified construction shown in FIG. 8 illustrates a conveyor 30B wherein the driven rolls R-L and R-T of a conveying section S2 are positively driven by endless belts 68B and 72B in order to provide variable rotational speed capabilities as may be required for more accurate and precise article control. Each belt is separately driven. A convenient manner of separately driving the belts is by mounting the belt 68B on two pulleys 69, the downstream one of which is powered by a chain and sprocket drive train 71 and the upstream one being journaled on its supporting shaft. The upper flight of the belt 68B is frictionally engaged with the adjacent ends of only the driven rollers R-L. The belt 72B is mounted on two pulleys 73, and the upstream pulley is driven by a chain and sprocket drive train 75 and the downstream pulley is journaled on its supporting shaft. The upper flight of the belt 72B is frictionally engaged with only the driven rollers R-T. In order to provide the capability of separate speed control for the driven rollers R-L and R-T, the drive trains 71 and 75 are separately powered, by means not shown, preferably with a continuously variable power source. It will be noted that a variable speed drive for the belts 68B and 72B will allow the capability of clockwise or counterclockwise rotation, either by directional movement of the belts, or by relative movement caused by rotating the driven rollers slower than their translational movement across the conveying surface.

Figure 9:
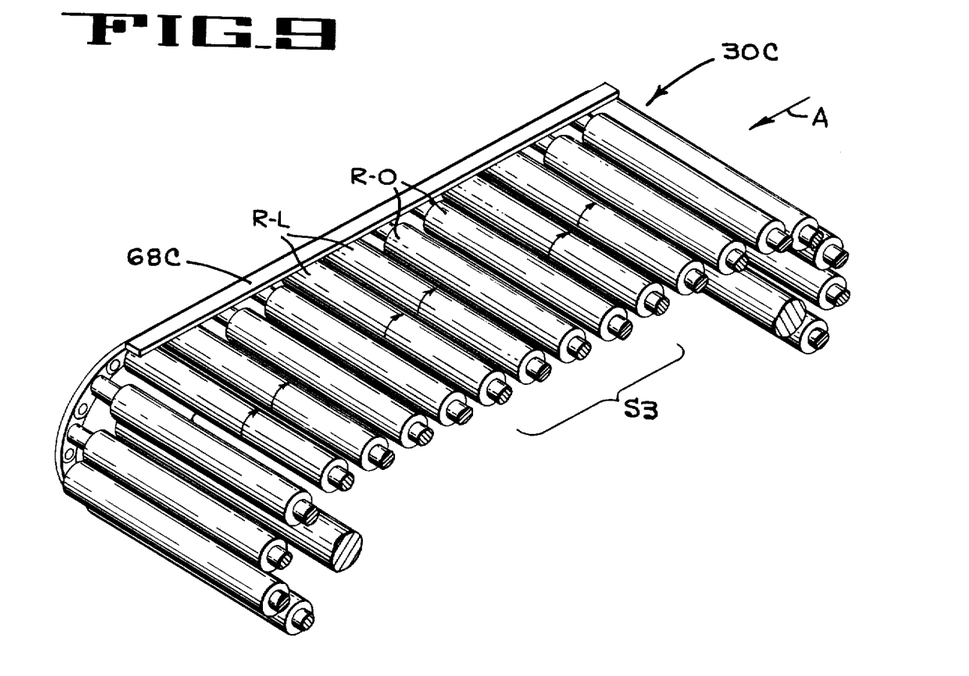

FIG. 9 shows yet another modification that the conveyor 30C can take in those instances where random discharge of the product from the conveyor 28 (not shown) to the conveyor 30C occurs. It should be noted that the construction of the conveyor according to FIG. 9 does not include a counterpart of the rail 72 since all of the driven rollers of a conveying section S3 are rotated counterclockwise and such rotation is effected by a rail 68c. Accordingly, the conveying section S3 of this modification includes two leading driven rollers R-L, rotating counterclockwise, and two idler rollers R-O. Experiments with this arrangement have been successful with variations in product length if the total length defined by the idler rollers R-O is approximately equal to 1½ product lengths and the speed of the conveyor 28 (not shown) is equal to the average product length times the number of products handled per minute by the infeed lug conveyor 34 (not shown). When abuttingly engaged products are discharged onto the conveyor 30C at the above defined rate, the product will always be moved backwardly by the driven rollers R-L to assume a stationary position over the idler rollers R-O.

Figure 10:
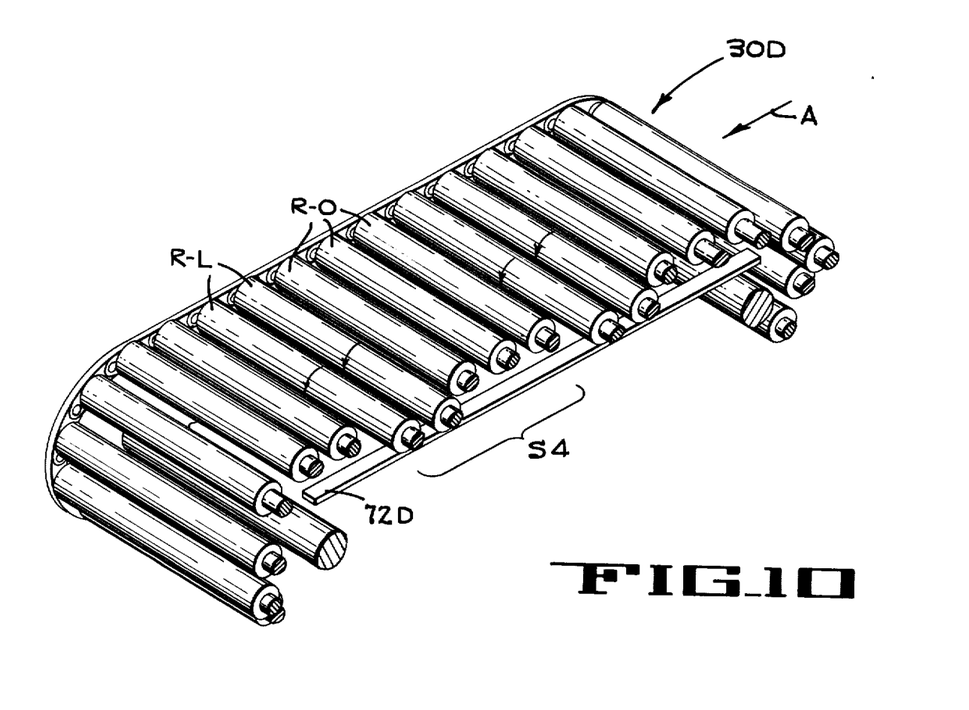

The conveyor 30D shown in FIG. 10 includes a single rail 72D for powering selected rollers in a counterclockwise direction. A conveying section S4 includes two leading driven rollers R-L and three idler rollers R-O. The length spanned by the idler rollers R-O in the direction of conveyor advance is equal to at least 2 product lengths, but no more than 2½ product lengths. It has been found desirable to operate the conveyor 28 at a slightly greater speed than the lug conveyor 34 of the wrapper, because occasional products which may be shorter than average will not cause any of the idler rollers R-O to be absent a product.

Figure 11:
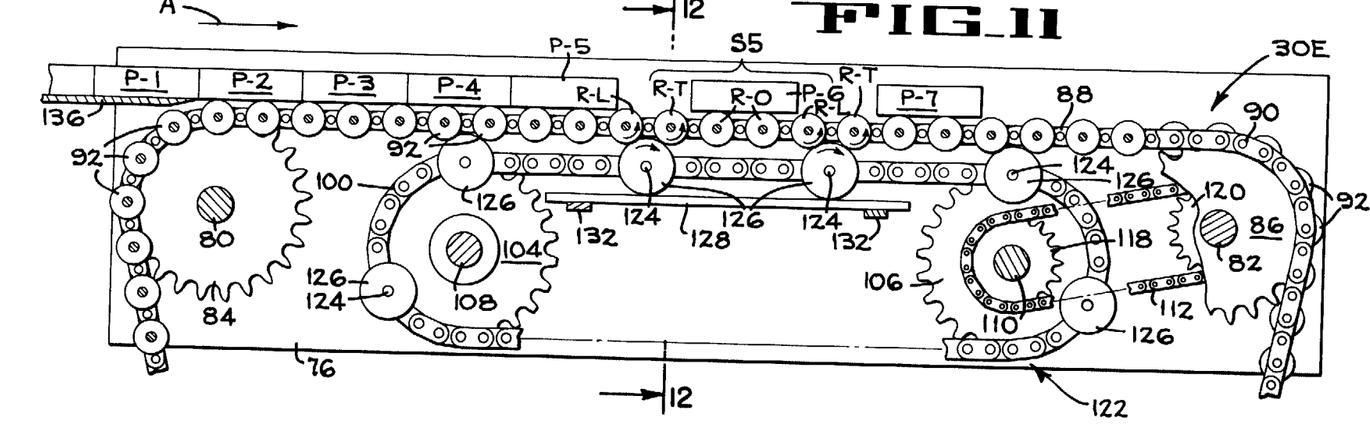
FIG. 11 illustrates another modified form which the invention may take.
Figure 12:
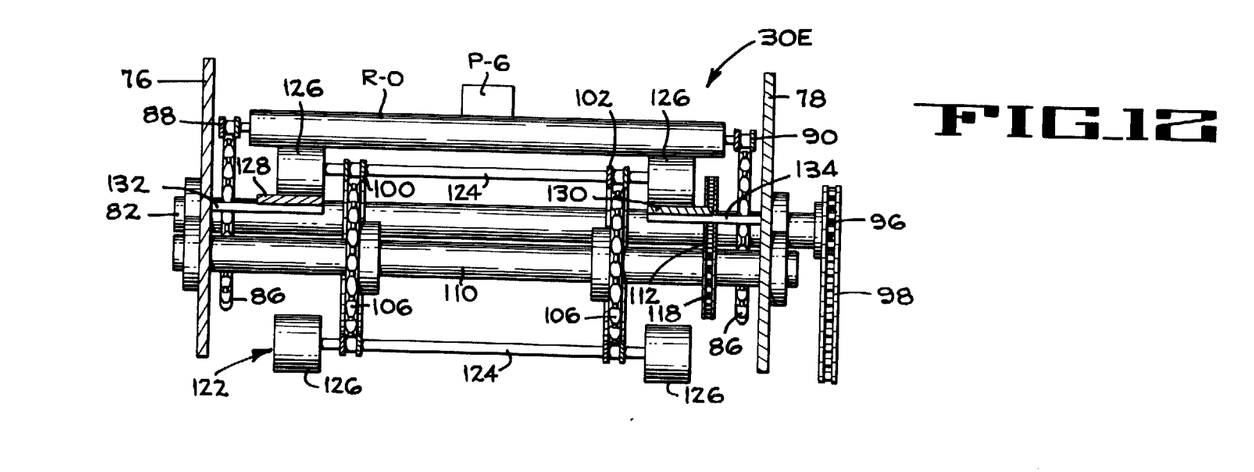
FIG. 12 is a transverse section taken substantially along the line 12—12 on FIG. 11.

FIGS. 11 and 12 show another form of a conveyor incorporating the novel concepts of the present invention. Broadly, the illustrated form comprises the usual pressureless roller conveyor (pressureless in that the transversely extending rollers are freely rotatably mounted on the laterally spaced chains) having a plurality of rollers rotatably mounted on laterally opposed driven chains. Within the orbit of the pressureless conveyor means are provided, operating in timed relation with the conveyor, for engaging and imparting rotation to selected rollers of the pressureless conveyor. The particular form shown in FIGS. 11 and 12 includes a conveyor 30E, mounted between side frame members 76 and 78, and moving in the direction of the arrow A. On shafts 80 and 82, which are rotatably mounted in the frames 76 and 78, sprockets 84 and 86 are keyed. Sprocket chains 88 and 90 (FIG. 12) support a plurality of transversely extending freely rotating rollers 92, and are driven by the laterally opposed sets of sprockets 84 and 86.

As shown in FIG. 12, a portion of the shaft 82 extends beyond the side plate 78 and has keyed thereon a sprocket 96 driven by a chain 98 which is connected to the drive of the wrapping machine 38. Thus, concurrent operation of the conveyor 30E is effected whenever the wrapping machine is in operation.

Within the orbit defined by the sprocket chains 88 and 90 are provided, operated in timed relation with the conveyor 39E, for engaging and rotating selected adjacent pairs of rolelrs 92. Such means comprise pairs of laterally spaced sprocket chains 100 and 102 in mesh with and driven by sprockets 104 and 106 that are, respectively keyed to shafts 108 and 110. The side frames 76 and 78 rotatably mount the shafts 108 and 110. The shaft 110 is driven by a sprocket chain 112 connected between a driving sprocket 120, keyed to the shaft 82, and a sprocket 118 keyed to shaft 110. Accordingly when the conveyor chains 88 and 90 are operating, concurrent operation of the conveyor chains 100 and 102 is effected by virtue of the sprocket chain 112 and its associated sprockets.

At selected longitudinally spaced distances, laterally extending friction drive elements, generally indicated as 122, are carried by the conveyor chains 100 and 102. Each element preferably comprises a transversely extending shaft 124 extending laterally beyond each of the conveyor chains, and an enlarged roller 126 rotatably mounted on each end of the shaft. Located below the upper horizontal reach of the sprocket chains 100 and 102, rails 128 and 130 for frictionally engaging and driving the rollers 126 are provided. Rail 128 is supported and connected to the side frame 76 by brackets 132 while rail 130 is connected and supported to the side frame 78 by brackets 134. Since the conveyor chains 100 and 102 are driven in synchronism with the conveyor chains 88 and 90 by virtue of the sprocket chain 112, the rollers 126 make first contact with a pair of adjacent rollers 92 when the rollers 126 commence traversing the upper horizontal reach.

Referring to FIG. 11 it will be seen that one of the rollers 126, at the twelve o'clock position relative to the sprocket 104, makes contact with two rollers 92 underlying the product P-4 which is one of a series of products identified as P-1 through P-7. Thus, as the rollers 126 come in contact with the rails 128 and 130, the turning moment applied by the rails, which is clockwise as viewed in FIG. 11, is imparted to two adjacent rolls 92 which define the trailing and leading roller of a conveying section S5. Accordingly, the conveying section S5 of the conveyor 30E includes a leading driven roller R-L rotating in a counterclockwise direction, followed by two idler rollers R-O and a trailing driven roll R-L also rotating in a counterclockwise direction.

The products P-1 through P-5 which are conveyed to the conveying reach of the conveyor 30E over a dead plate 136 are in abutting relation and such relationship is altered by removing and locating the leading product over the idler rollers R-O by the action of the driven rolls R-L and R-T. For example, the product P-6 is shown only supported by the two idler rollers R-O. Its separation from the product P-5 occurs when the counter-clockwise rotating roller R-L holds back the product P-5 in abutting engagement with the product P-4. It remains in this position since the roller 126, which is located at the twelve o'clock position, has not yet encountered the stationary rails 128 and 130 therefore it is at this time free to idle and consequently no motion is imparted to the products which would cause longitudinal separation. Accordingly, as the rollers 126 engage the stationary rails 128 and 130 causing their rotation the various abutted products are progressively longitudinally spaced and are maintained in that position until they are received by the infeed conveyor 34 (not shown) of the wrapping machine 38.

Figure 13:
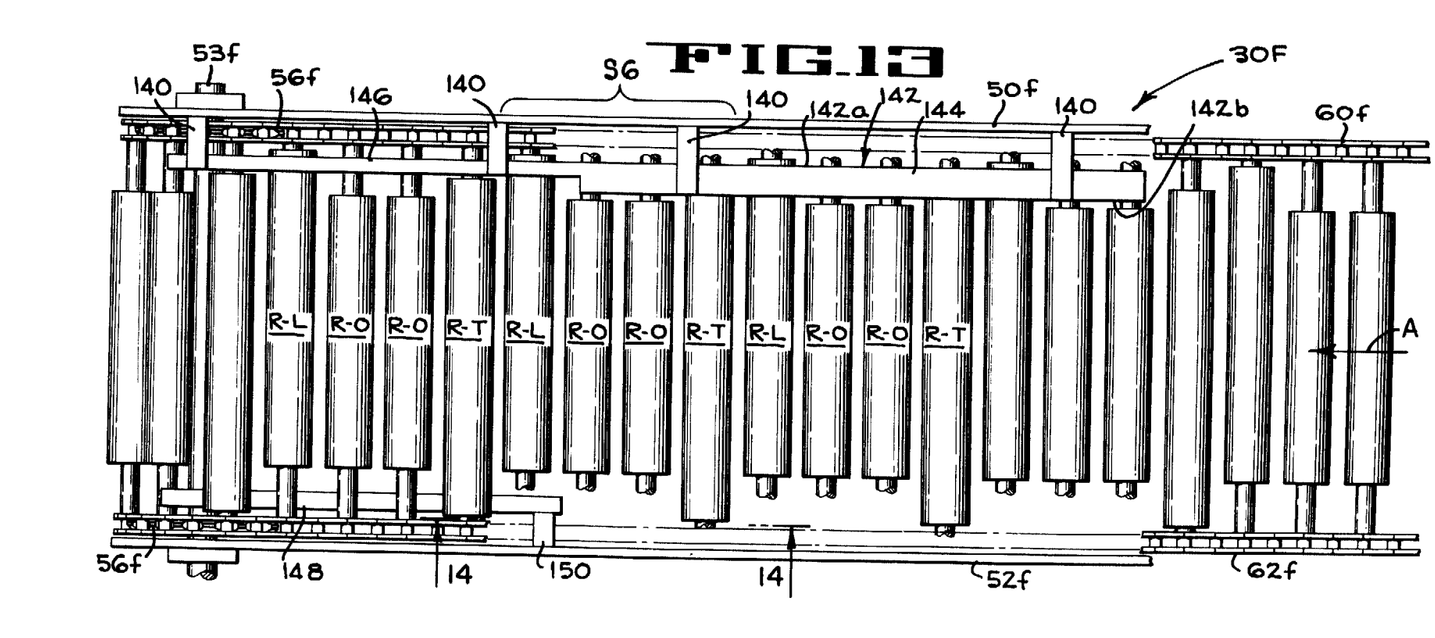
FIG. 13 is a plan of another modified form of the conveyor incorporating the principles of the present invention.
Figure 14:
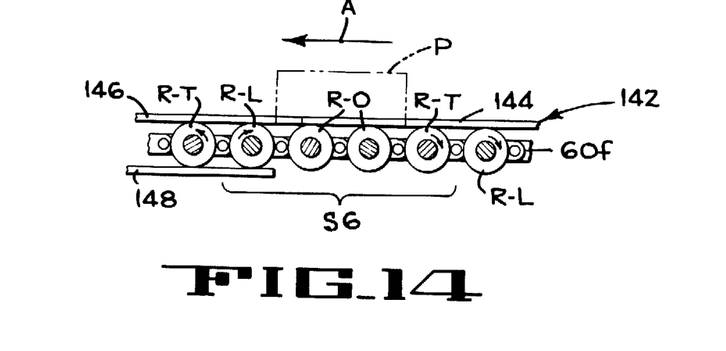
FIG. 14 is a fragmentary longitudinal section taken substantially along the line 14—14 of FIG. 13.

Another form which the novel conveyor of the present invention can take is shown in FIGS. 13 and 14. The basic construction of the conveyor 30F is generally similar to that shown and described in FIG. 3, but the cooperation of the rails and the rollers is modified so that one roller, advanced in the direction of the arrow A, rotates in one direction and then in another direction as it traverses the stationary rotation imparting rails. The design which will be presently described is particularly effective in causing longitudinal separation of the products which may exhibit, as a result of their geometry, surface condition or weight, resistance to such separation. A conveying section S6 of rollers in the illustrated embodiment comprises a loading driven roll R-L followed by two idler rollers R-O and a trailing driven roll R-T which for a portion of its travel rotates in a clockwise direction and then in a counterclockwise direction. As illustrated, the conveyor 30F shown in FIG. 13 comprises the usual side frames 50f and 52f and sprocket chains 60f and 62f driven by sprockets 56f keyed to the shaft 53f which is rotatably supported in the side frames. The shaft 53f is driven by the drive of the wrapping machine 38.

Rigidly supported to the side frame 50f, by means of a plurality of longitudinally spaced brackets 140, is an overlying rail generally identified as 142 which is formed with a wide portion 144 and a narrow portion 146. The other side frame 52f mounts an underlying track portion 148 connected thereto by brackets 150.

Considering one conveying section S6, it will be observed that the large diameter portion of the leading driven roll R-L extends slightly beyond the edge 142a of the upper rail 142, thus imparting rotation to the roll R-L for the entire length of the rail 142. The opposite end, connected to the chain 62f, is provided with a smaller diameter portion which does not make contact with the lower rail 148. The trailing roll driven R-T has its large diameter portion terminating substantially midway between the lateral edges 142a and 142b of the rail 142 so that rotation thereof in a clockwise direction is effected for the distance equal to the length of the rail portion 144. It should be observed that when the trailing driven roll R-T is beyond the rail portion 144 its clockwise rotation ceases and it comes in contact with the lower rail 148 reversing its direction of rotation to a counterclockwise direction. The intermediate idler rolls R-O do not come in contact with either of the rails 142 and 148. Thus, as in the prior described embodiments, no rotation to these rolls occurs.

To summarize, a conveying section of the embodiment shown in FIG. 13 comprises a leading driven roll R-L which is rotated in a counterclockwise direction for length of the rail 142, two intermediate non-rotating idler rolls R-O and a trailing driven roll R-T which is rotated in a clockwise direction during contact with the wide rail portion 144 and is subsequently immediately rotated in a counterclockwise direction by the underlying rail 148. The changes in rotational direction of the trailing roll is illustrated in FIG. 14 which shows a trailing roll R-T in contact with the wide rail portion 144 rotating in a clockwise direction, and the trailing roll of a leading conveying set rotating in a counterclockwise direction occurring when frictional engagement with the lower rail 148 is established.

By providing a conveyor modified as above described a more positive in-line separation of products occurs in the event the products have particular characteristics such as the weight, geometry and/or surface conditions which require reverse rotation of the trailing driven roll to initially, when the driven article support rollers are in frictional engagement with the wide rail portion 144, effect rearward longitudinal separation of the product from the preceding product, and then maintain the product on the idler rolls by virtue of effecting counterclockwise rotation of the trailing driven roll when it comes in frictional engagement with the rail portion 148.

From the preceding description, it is evident that the basic concept of the present invention is an article feed mechanism in which the driven rollers attain the effect of conventional timing lugs without impact, shear or anything but supporting contact with the articles. Thus, the driven rollers are, in effect, gap-producing conveying sections which allow access to the formerly abutting articles by the overhead conveying lugs 42, and the conveying section 30 is especially adapted to handle products which can vary considerably in length, as well as height and width. In particular, it should be noted that the spacing of products on the conveyors 30, 30A, 30B, 30C, 30D, 30E or 30F is not necessarily the same as the product spacing required by the conveying lugs of the machine to which the articles are fed, because the operational concept only requires that the speed of the conveyor 28 is the average product length times the number of products per minute which are handled by the machine to which the products are fed.

It should again be noted that with a belt driving arrangement as shown in FIG. 8, the driven rollers R-L and R-T can be driven not only at any desired rotational speed, but in reverse direction (without a reversible power source) if the drive belt is traveling slower than the translational movement of the rollers.

Although the best mode contemplated for carrying out the present invention has been herein shown and described, it will be apparent that modification and variation may be made without departing from what is regarded to be the subject matter of the invention.

What is claimed is:

1. A conveying mechanism comprising an endless conveyor having an article supporting reach for spacing articles predetermined distances apart, means for driving said conveyor to translate said reach,
    said conveyor including a series of article-spacing sections each including a static zone comprising a plurality of transversely extending freely journaled idler rollers, and a dynamic zone on each side of each said static zone, each including at least one driven roller,
    each of said idler rollers and said driven rollers including upper article supporting surfaces which are rollable relative to the article and which cooperate to define a substantially flat surface while in said article supporting reach,
    means for rotating said driven rollers along said reach, at least one of said driven rollers of an article spacing section being arranged to reposition an article engaged therewith onto the idler rollers of said section while an article is conveyed along said reach, said driven roller engaging the article being effective to move the article onto and thereby rotate the rollers of the static zone until the frictional force between the article and engaged driven roller section is insufficient to cause the idler rollers to rotate and move the article any further relative thereto.

2. A conveying mechanism comprising an endless conveyor having an article supporting reach for spacing articles predetermined distances apart, means for driving said conveyor to translate said reach, said reach including at least one article spacing section that includes a static conveying section comprising a predetermined plurality of transversely extending freely journaled idler rollers withh one intermediate dynamic conveying section on each side of each static conveying section, each dynamic section including at least one predetermined driven dynamic roller, each of said idler rollers and said dynamic rollers including upper article supporting surfaces which are rollable relative to the article and which cooperate to define a substantially flat surface while in said article supporting reach, and means for rotating said dynamic rollers of said dynamic sections, each of said dynamic sections being arranged to reposition an article engaged therewith onto the idler rollers of an adjacent static section at a location normally spaced from the dynamic rollers while an article is conveyed along said reach, said means for rotating said dynamic rollers comprising stationary rails one of which is located above and engageable with selective leading dynamic rollers of an article spacing section and another rail located below and engageable with trailing dynamic rollers of the article spacing section, and at least two non-powered idler rollers between said leading and trailing driven dynamic rollers.

3. A conveying mechanism comprising an endless conveyor having an article supporting reach for spacing articles predetermined distances apart, means for driving said conveyor to translate said reach, said reach including at least one article spacing section that includes a static conveying section comprising a predetermined plurality of transversely extending freely journaled idler rollers with one intermediate dynamic conveying section on each side of each static conveying section, each dynamic section including at least one predetermined driven dynamic roller, each of said idler rollers and said dynamic rollers including upper article supporting surfaces which are rollable relative to the article and which cooperate to define a substantially flat surface while in said article supporting reach, means for rotating said dynamic rollers in said dynamic sections, each of said dynamic sections being arranged to reposition an article engaged therewith onto the idler rollers of an adjacent static section at a location normally spaced from the dynamic rollers while an article is conveyed along said reach, a stationary frame for supporting said conveyor, and roller rotating means mounted on said frame for driving said predetermined dynamic rollers in response to movement of said conveyor relative to said roller rotating means, said roller rotating means including a stationary rail overlying said rollers for imparting rotation in one direction to two leading dynamic rollers of an article spacing section, and a rail underlying said rollers for imparting rotation in an opposite direction to a trailing dynamic roller of such article spacing section, said overlying rail including two aligned rail sections that define a gap which momentarily interrupts rotation to said leading dynamic rollers.

4. The apparatus according to claim 3 wherein said article spacing section comprises two leading dynamic rollers rotated in a direction moving the upper surfaces of said two leading dynamic rollers rearward relative to the direction of movement of said article spacing section, at least two non-powered rollers, and a trailing roller rotated in a direction counter to said leading rollers.

5. A conveying mechanism comprising an endless conveyor having an article supporting reach for spacing articles predetermined distances apart, means for driving said conveyor to translate said reach, said reach including at least one article spacing section that includes a static conveying section comprising a predetermined plurality of transversely extending freely journaled idler rollers with one intermediate dynamic conveying section on each side of each static conveying section, each dynamic section including at least one predetermined driven dynamic roller, each of said idler rollers and said dynamic rollers including upper article supporting surfaces which are rollable relative to the article and which cooperate to define a substantially flat surface while in said article supporting reach, means for rotating said dynamic rollers in said dynamic sections, each of said dynamic sections being arranged to reposition an article engaged therewith onto the idler rollers of an adjacent static section at a location normally spaced from the dynamic rollers while an article is conveyed along said reach, a stationary frame for supporting said conveyor, and roller rotating means mounted on said frame for driving said predetermined dynamic rollers in response to movement of said conveyor relative to said roller rotating means, said roller rotating means including a stationary rail overlying said rollers for imparting rotation in one direction to two leading dynamic rollers of an article spacing section, and a rail underlying said rollers for imparting rotation in an opposite direction to two trailing rollers of said article spacing section.

6. A conveying mechanism comprising an endless conveyor having an article supporting reach for spacing articles predetermined distances apart, means for driving said conveyor to translate said reach, said reach including at least one article spacing section that includes a static conveying section comprising a predetermined plurality of transversely extending freely journaled idler rollers with one intermediate dynamic conveying section on each side of each static conveying section, each dynamic section including at least one predetermined driven dynamic roller, each of said idler rollers and said dynamic rollers including upper article supporting surfaces which are rollable relative to the article and which cooperate to define a substantially flat surface while in said article supporting reach, and means for rotating said dynamic rollers in said dynamic sections, each of said dynamic sections being arranged to reposition an article engaged therewith onto the idler rollers of an adjacent static section at a location normally spaced from the dynamic rollers while an article is conveyed along said reach, said means for rotating said dynamic rollers imparting rotation to said dynamic rollers and comprises power driven means frictionally engageable with predetermined adjacent longitudinally spaced rollers, said power means comprising a plurality of equally longitudinally spaced rolls carried by laterally spaced chains mounted for orbital movement within the orbit of said conveying mechanism, said laterally spaced chains carrying said rollers having a reach located below and substantially parallel to the article supporting reach, and means operative when the rolls traverse said parallel reach for rotating said rolls which in turn impart rotation to the dynamic rollers of said article spacing section.

7. A feed conveyor for spacing a row of incoming abutting articles comprising an endless roller conveyor movable along a longitudinal path and having a reach for supporting the articles, means for driving said conveyor to translate said rollers with the upper surfaces of all rollers along said reach being tangent to a common plane for defining a rollable article supporting surface which is substantially flat, said rollers being arranged in predetermined groups of idler rollers and having predetermined driven rollers at both ends of each group of idler rollers, means for rotating said driven rollers while they translate across said reach, the direction of rotation of said driven rollers and the length and weight of each article being such that each moving article on said reach is frictionally engaged by at least one of said driven rollers for additionally driving each article longitudinally relative to said conveyor along said reach to rotate the associated idler rollers, said driven rollers causing said associated idler rollers and the articles to move relative to the conveyor until said frictional engagement is insufficient to continue movement of the article and supporting idler rollers at which time the article moves into substantially centered rest position on said idler rollers thereby uniformly spacing the adjacent articles.

8. An article feed and spacing mechanism comprising an endless roller conveyor movable along a longitudinal path and having a reach for supporting and conveying the articles, means for driving said conveyor to spatially move said rollers along said reach, said rollers being arranged in spaced groups of at least two freely rotatable idler rollers with a driven roller at each side of said idler rollers, and means for rotating said driven rollers in opposite directions, the longitudinal distance between each adjacent pair of driven rollers being greater than the length of an article being conveyed so that the moving articles on said reach are frictionally engaged and additionally driven either forward or backward by said driven rollers relative to said conveyor to first rotate the associated idler rollers and to then achieve rest position on said idler rollers thereby uniformly interspacing the articles, said idler rollers terminating rotation when said frictional engagement is insufficient to continue movement of the article and drive said idler rollers at which time the articles are substantially centered.

9. An article feed and spacing mechanism comprising an endless roller conveyor movable along a longitudinal path and having a reach for supporting and conveying the articles, means for driving said conveyor to spatially move said rollers along said reach, said rollers being arranged in predetermined spaced groups of free rollers with at least two predetermined driven rollers intermediate each of said groups, and means for rotating said driven rollers at each side of a group in opposite directions to move the article toward the center of the group of intermediate free rollers with the article imparting rotation to the free rollers until centered, the center to center distance of adjacent driven rollers on opposite sides of each group of free rollers being greater than the length of the articles being conveyed so that the moving articles on said reach are centered in relation to and are supported by said free rollers.

10. A feed conveyor for spacing a row of incoming abutting articles comprising an endless roller conveyor movable along a longitudinal path and having a substantially planar reach for supporting the articles, means for driving said conveyor to spatially move said rollers along said reach, said rollers being arranged in spaced groups of at least two free rollers, and two driven rollers at each side of said free rollers, means for rotating said driven rollers in each group of driven rollers in opposite directions, the center to center distance between the driven rollers confronting said free rollers being greater than the length of the supported article so that the moving articles on said reach are additionally driven either forward or backward relative to said endless roller conveyor to cause the article to achieve rest positions on said free rollers and uniform spacing to the adjacent articles, said free rollers in each group being rotated only in response to movement of the supported article thereon and terminating their rotation when the article is in its substantially centered rest position.

* * * * *

UNITED STATES PATENT OFFICE
CERTIFICATE OF CORRECTION

PATENT NO. : 3,894,627
DATED : July 15, 1975
INVENTOR(S) : ROBERT O. JABBUSCH et al It is certified that error appears in the above-identified patent and that said Letters Patent are hereby corrected as shown below:

Column 1, line 29;  delete "and".

Column 2, line 36;  after "driven" add --or--.

Column 4, line 64;  change "of" (first occurrence) to --or--.

Column 8, line 56;  after "90" insert --means--.

Column 8, line 57;  change "39E" to --30E--.

Column 8, line 58;  change "rolelrs" to --rollers--.

Column 10, line 2;  change "loading" to --leading--.

Column 11, line 64;  change "withh" to --with--.

Signed and Sealed this third Day of February 1976

[SEAL]

Attest:

RUTH C. MASON
Attesting Officer

C. MARSHALL DANN
Commissioner of Patents and Trademarks